(12) United States Patent
Varonen et al.

(10) Patent No.: US 9,052,106 B2
(45) Date of Patent: Jun. 9, 2015

(54) METHOD AND ARRANGEMENT FOR OPTIMISING COMBUSTION CONDITIONS IN A FLUIDISED-BED BOILER

(75) Inventors: Mikko Varonen, Tampere (FI); Tero Luomaharju, Kämmenniemi (FI)

(73) Assignee: VALMET TECHNOLOGIES OY, Espoo (FI)

( * ) Notice: Subject to any disclaimer, the term of this patent is extended or adjusted under 35 U.S.C. 154(b) by 721 days.

(21) Appl. No.: 13/390,881

(22) PCT Filed: Aug. 9, 2010

(86) PCT No.: PCT/FI2010/050620
§ 371 (c)(1),
(2), (4) Date: Feb. 16, 2012

(87) PCT Pub. No.: WO2011/020945
PCT Pub. Date: Feb. 24, 2011

(65) Prior Publication Data
US 2012/0148961 A1    Jun. 14, 2012

(30) Foreign Application Priority Data
Aug. 17, 2009 (FI) ................................ 20095849

(51) Int. Cl.
F23J 7/00 (2006.01)
F23C 10/10 (2006.01)
(Continued)

(52) U.S. Cl.
CPC .................. *F23C 10/10* (2013.01); *F23C 6/045* (2013.01); *F23C 10/20* (2013.01); *F23C 10/28* (2013.01); *F23C 2201/101* (2013.01);
(Continued)

(58) Field of Classification Search
CPC ..................................... F23J 7/00; F23L 9/00
USPC ........ 431/4, 7, 9, 10; 110/347, 348, 345, 210, 110/214, 341; 122/4 D
See application file for complete search history.

(56) References Cited

U.S. PATENT DOCUMENTS 4,934,282 A    6/1990  Asai et al.
4,962,711 A   10/1990  Yamauchi et al.
(Continued)

FOREIGN PATENT DOCUMENTS

EP      0 181 108 A2    5/1986
GB        2093367 A     9/1982
WO    WO-99/40370 A1    8/1999

OTHER PUBLICATIONS

Supplementary European Search Report dated Feb. 13, 2015 for Application No. 10809592.8.

*Primary Examiner* — Gregory Huson
*Assistant Examiner* — Nikhil Mashruwala
(74) *Attorney, Agent, or Firm* — Birch, Stewart, Kolasch & Birch, LLP

(57) ABSTRACT

A method and an arrangement for optimizing combustion conditions in a fluidized-bed boiler, in which combustion gas is fed at two or more height levels, the first of which is a primary level (P) which is located at the height of a furnace bottom and the second is a secondary level (S) which is located above fuel feed height (F), above which secondary level (S) there can be still other combustion gas feed levels (T, . . . ). At least one combustion gas feed level (P, S, T, . . . ) is fed at different points of the furnace (11) in its horizontal direction with combustion gases having different oxygen contents such that zones of different oxygen content can be formed in the horizontal direction of the furnace (11).

8 Claims, 3 Drawing Sheets

(51) Int. Cl.
*F23C 6/04* (2006.01)
*F23C 10/20* (2006.01)
*F23C 10/28* (2006.01)
*F23L 7/00* (2006.01)
*F23L 9/02* (2006.01)
*F23L 9/04* (2006.01)

(52) U.S. Cl.
CPC  *F23L 7/007* (2013.01); *F23L 9/02* (2013.01); *F23L 9/04* (2013.01); *F23L 2900/07001* (2013.01); *F23L 2900/07007* (2013.01); *F23N 2037/18* (2013.01); *F23N 2037/26* (2013.01); *Y02E 20/322* (2013.01); *Y02E 20/344* (2013.01)

(56) References Cited

U.S. PATENT DOCUMENTS

| | | | |
|---|---|---|---|
| 5,620,488 | A | 4/1997 | Hirayama et al. |
| 5,660,125 | A | 8/1997 | Tanca |
| 2002/0185043 | A1* | 12/2002 | Marin et al. ............... 110/347 |
| 2005/0257721 | A1* | 11/2005 | Okazaki et al. ............ 110/204 |
| 2006/0196400 | A1* | 9/2006 | Martin et al. .............. 110/341 |
| 2009/0007827 | A1* | 1/2009 | Sarv et al. ................. 110/345 |
| 2012/0024206 | A1* | 2/2012 | Varonen .................... 110/348 |
| 2013/0055937 | A1* | 3/2013 | Mitsui et al. .............. 110/345 |

* cited by examiner

METHOD AND ARRANGEMENT FOR OPTIMISING COMBUSTION CONDITIONS IN A FLUIDISED-BED BOILER

This application is the National Phase Under 35 U.S.C. §371 of PCT International Application No. PCT/FI2010/050620 which has an International filing date of Aug. 9, 2010, which claims priority to Finnish Application No. 20095849 filed on Aug. 17, 2009. The entire contents of all applications listed above are hereby incorporated by reference.

The invention relates to a method for optimising combustion conditions in a fluidised-bed boiler, in which oxygenous combustion gas is fed at two or more height levels, the first of which is a primary level that is located at the height of a furnace bottom, and the second is a secondary level that is located close to fuel feed height, above which secondary level there can be still other combustion gas feed levels. The invention also relates to an arrangement for implementing the equivalent method.

Concern about climate change has brought on seeking new means to reduce carbon dioxide emissions in energy production which cause global warming. One of the means suggested for diminishing greenhouse emissions is oxyfuel combustion. When fuel is combusted in a traditional way by means of air, flue gas contains a considerable quantity of nitrogen which originates from the air. The recovery of carbon dioxide from such flue gas is expensive and technically difficult. When combustion air used in combustion is replaced by a mixture of pure oxygen and circulated flue gas, flue gas produced as the result of combustion mainly contains carbon dioxide, oxygen, water vapour, and some impurities. Oxyfuel combustion enables relatively simple recovery of carbon dioxide. After water that has been carried along with fuel or developed in combustion reactions has been removed from flue gas by condensing, the remaining carbon dioxide can be liquefied by cooling and compressing. Oxyfuel combustion can be utilised in both pulverised fuel combustion and fluidised bed combustion.

In fluidised bed combustion, the combustion occurs in solids suspension which is fluidised and circulated by means of a gas flow blown from below. The fluidised bed consists of particle-like fluidised material (e.g. sand), fuel, combustion gas, as well as flue gas and ashes produced in combustion. In this context, combustion gas refers to primary and secondary gas, which usually is air or some other oxygenous gas mixture. The primary gas flow is supplied at the bottom of the furnace and the secondary gas flow is guided to the furnace via nozzles on its walls above the grate plane. In a bubbling fluidised bed boiler (BFB), fluidised material stays in the fluidising space whereas, in a circulating fluidised bed boiler (CFB), fluidised material drifts along with flue gas out of the fluidising space and, to provide a steady state, it is returned to the furnace via separating and circulating devices.

The fluidised-bed boiler utilises low combustion temperature (700-900° C.) compared to pulverised fuel combustion, which together with staged air supply enables low nitrogen oxide emissions. Nitrogen oxides ($NO_X$) refer to nitrogen oxide (NO) and nitrogen dioxide ($NO_2$) which are mostly produced from nitrogen contained by fuel in fluidised bed combustion. Staging of air supply provides reducing conditions in the lower section of the bed, whereby less nitrogen oxides are produced. The rest of air required for perfect combustion is supplied as secondary and possibly tertiary air. The fluidised bed combustion technology also enables the desulphurisation of flue gases already in the boiler by supplying lime or dolomite directly to the furnace. Specifications U.S. Pat. No. 4,704,084 and U.S. Pat. No. 4,962,711 describe examples of prior-art circulating fluidised bed boilers which aim at reducing $NO_X$ emissions by the staged feed of combustion air.

Fuel is fed to the furnace above the primary level close to the secondary level. Different types of fuels spread in the furnace in different ways. Light fuel fractions, such as fine peat or paper and plastic shreds, easily lift as a block upwards from their feed point without spreading sideways particularly well. This is particularly emphasised in circulating fluidised bed combustion where the fluidisation speed is high compared to the end speed of fuel particles, whereby fuel is swept along with fluidisation gas upwards. Horizontally uniform feed of secondary air is suited for well-spreading fuels, such as coal or wet wood. With light fractions, a CO column rises upwards from the fuel feed points and oxygen-rich sections are formed between the fuel feed points. Because the phenomenon cannot be adjusted with modern techniques, the gas and temperature profiles of the upper combustion space alter uncontrollably as the fuel quality varies. This is disadvantageous e.g. in controlling the temperature profile and in controlling emissions, particularly $NO_X$, where it is essential to leave a suitable CO level in the flue gases so that NO is reduced in the combustion space and lower emissions of nitrogen oxides are obtained.

Specification U.S. Pat. No. 5,660,125 describes a method for minimising the formation of nitrogen oxides in a circulating fluidised bed boiler, in which method, the feed of secondary air is staged in both vertical and horizontal direction. Each flow channel supplying combustion air in secondary nozzles is provided with a damper by means of which it is possible to control the feed of combustion air via the nozzle in question to the furnace. The object is to keep the stoichiometrics of combustion locally in the range of 70-90%, whereby $NO_X$ formation is lowest. A problem of this arrangement is, inter alia, the fact that, when increasing or decreasing the feed of secondary air, the penetration of air in the fluidised bed also changes.

In oxyfuel combustion, combustion air is replaced by a mixture of oxygen and circulated flue gas. If the process is run with a standard oxygen concentration, as usual in air combustion, diminishing the quantity of primary gas to provide a reducing zone decreases the internal and external circulation of fluidised material, whereby heat transfer onto the furnace walls and into a possible external heat exchanger also weakens. Furthermore, the temperature in the fluidised bed can rise too high, which results in sintering of solid particles.

Primary gas is usually supplied to the lower section of the furnace via an air box. The air box can be divided into two or more blocks to decrease the pulsation of the bed. However, each block is fed with the same combustion gas, which in normal air combustion is air and in oxyfuel combustion a mixture of oxygen and circulated flue gas.

It is possible to aim at improving the reduction of nitrogen oxides in oxyfuel combustion by decreasing the oxygen content of primary gas. Then, below the secondary gas nozzles are created reducing conditions, which enhances the reduction of nitrogen oxides which have come along with primary gas to nitrogen. A problem of this arrangement is the fact that, when decreasing oxygen feed, the temperature of the bed can drop too low. If equivalently the oxygen content of secondary gas is risen to provide perfect combustion, a temperature peak is created at the secondary level, which is disadvantageous to emissions and promotes the formation of agglomerates.

An object of the invention is to avoid the above-described problems. A general object is to enhance the control of combustion conditions and the reduction of nitrogen oxides in a fluidised-bed boiler.

To achieve these objects, the method according to the invention is characterised by what is presented in the characterising part of claim 1. Equivalently, the arrangement according to the invention is characterised by what is presented in the characterising part of claim 5.

In the method according to the invention, at least one feed level of combustion gas at different points of the furnace in its horizontal direction is fed with combustion gases having different oxygen contents such that zones with different oxygen contents can be formed in the horizontal direction of the furnace.

In one embodiment of the invention, the primary level is divided in the horizontal direction into two or more zones and to at least one of these zones is guided combustion gas having an oxygen content different from the oxygen content of combustion gas guided to at least one zone adjacent to it. This is provided e.g. by dividing the air box that feeds combustion gas into two or more blocks and by supplying at least one block with combustion gas having an oxygen content different from that of combustion gas supplied to the adjacent block, whereby at least one oxidising zone and at least one reducing zone can be formed at the furnace bottom.

In another embodiment of the invention, the secondary level and/or one of the levels above it is/are divided in the horizontal direction into two or more zones and to at least one of these zones is guided combustion gas having an oxygen content different from the oxygen content of combustion gas guided to at least one zone adjacent to it.

Advantageously, the fuel feed height includes several fuel feed points, and a zone is formed below and/or above each fuel feed point in which at least one feed level of combustion gas is fed with combustion gas having an oxygen content different from that of zones being farther from the fuel feed point at the same feed level.

By adjusting the oxygen content of primary gas fed to the different blocks/chambers, it is possible to affect, inter alia, the temperature of the furnace and the reduction of nitrogen oxides. The oxygen content and fluidisation speed of each block can be adjusted independently or together with some other block. The blocks/chambers provided with various feeds of combustion gas can alternate in the longitudinal or cross direction of the furnace. Alternatively, it is possible to arrange a feed chamber below the fuel feed point at the primary level via which the furnace is fed with primary gas having an oxygen content different from the oxygen content of primary gas being fed on the edges of the furnace and/or between the feed points.

By adjusting the oxygen contents of the different blocks in the air box, it is possible to create advantageous conditions for $NO_X$ and S reduction in a section below the secondary level. Thus, good reduction of nitrogen oxides is provided due to reducing zones and sufficient temperature due to oxidising zones. The oxidising zones provide that sulphur reduction does not weaken. The adjustment of the oxygen content of the blocks in the air box is a new additional parameter in the adjustment of the temperature profile of the furnace. Due to the enhanced S and $NO_X$ reduction occurring in the furnace, the requirement for using the purification methods of secondary flue gases is slighter than previously. Then, the purification and liquation of carbon dioxide are more cost-effective.

When the gas nozzles of the secondary and/or tertiary level are divided into at least two sets and each set is fed with combustion gases having different oxygen contents, it is possible to control the feed quantity and oxygen content of combustion gas in the horizontal direction locally. Usually, an optimal gas flow is required close to the fuel feed point to spread and mix the fuel to provide uniform combustion. When the oxygen content of this gas flow is separately adjustable, it is easier than previously to control combustion conditions and temperatures with various fuels.

Fluidisation speed can be kept constant or it can be adjusted independently when the oxygen contents of primary and secondary gases are separately adjustable at a wide range. When decreasing the oxygen content of the primary gas, the ratio of oxygen in the secondary gas can be equivalently increased in order to provide a desired total oxygen content.

It is possible to supply secondary gas at several different height levels and different oxygen contents can be used at different levels in order for unburnt material carried from the reducing zone not to cause a large temperature peak at the secondary level. Thus, it is possible to prevent the forming of a hot oxygenous section at the secondary level, which could easily lead to the production of nitrogen oxides.

The invention provides an easy method based on run mode for the reduction of nitrogen oxides in a circulating fluidised bed boiler. By varying the oxygen contents of primary and secondary gases, it is possible to adjust the temperatures of the furnace, which is important for sulphur reduction, among others.

It is important in connection with oxyfuel combustion that the effective reduction of nitrogen oxides decreases the risk of $NO_X$ reacting with water and oxygen thus producing caustic nitric acid in the pressurisation of flue gas, which could cause problems in the cleansing and pressurising facility of carbon dioxide.

By means of the invention, the process can be controlled better when operating with various fuels. In addition to reducing $NO_X$ emissions, an advantage of the invention is the decreased risk of after-combustion in the cyclone.

The invention will now be described with reference to the figures of the accompanying drawings, to which the invention is by no means intended to be narrowly defined.

FIG. 1 schematically shows the operation of a circulating fluidised bed boiler and the feed of combustion gases to a furnace.

FIG. 2 shows the feed of primary gas by zones.

FIG. 3 schematically shows a side view of a front section of the furnace and feed levels of combustion gases.

Figure 1:
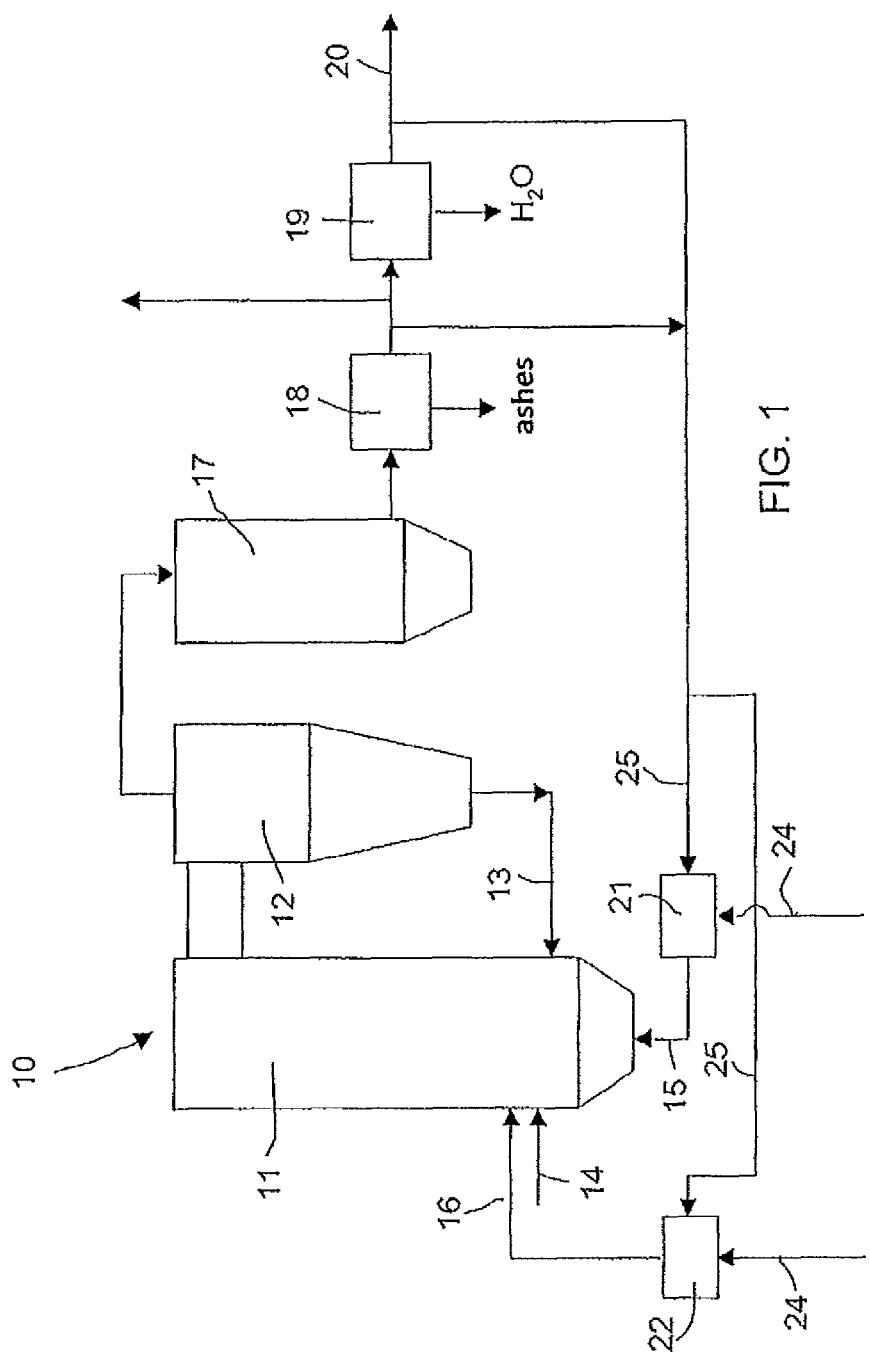

A circulating fluidised bed boiler 10 shown in FIG. 1 comprises a furnace 11 in which fuel is combusted in a circulating fluidised bed, a cyclone separator 12 in which fluidised material is separated from flue gas, and a return channel 13 via which fluidised material is circulated back to the furnace 11. Fuel 14 is supplied to the furnace 11 to which is also supplied oxygenous fluidisation and combustion gas in the form of primary gas 15 and secondary gas 16. Combustion takes place in the fluidised bed which is put to fluidise and circulate by means of the primary gas flow 15 supplied from below.

The fluidised bed consists of solid inert bed material, which is usually sand, fuel fed to it, fuel ashes, possible limestone, combustion gas, and flue gas produced in combustion. The gas flows 15, 16 are arranged so great that a part of fluidised material exits along with flue gas from the upper section of the furnace 11 to the cyclone separator 12. The cyclone separator 12 separates solid particles from the flue gas and they are returned to the furnace 11 via the return channel 13 and an external heat exchanger (not shown in the figure) possibly connected to it.

After separating solid matter, the flue gas is guided from the cyclone separator 12 to heat recovery 17 and from there further to fly ash separation 18, which can be implemented e.g. with electrostatic filters or bag hoses. After the fly ash separation 18, the flue gas can be guided via a chimney to outdoors or, in the case of oxyfuel combustion, to a condenser 19 in which water and gaseous impurities are separated from it by condensing. After the condenser 19, flue gas 20 of oxyfuel combustion mainly contains carbon dioxide, which can be cleansed and pressurised with methods known as such.

The primary gas flow 15 is supplied at the bottom of the furnace 11 via an air box (not shown in the figure) or equivalent. One or more secondary gas flows 16 are supplied above the bottom via injection nozzles (not shown in the figure) on the walls of the furnace 11. The combustion gases 15, 16 include air and/or oxygen and/or circulated flue gas mixed at a desired ratio. In oxyfuel combustion, the main components of circulated flue gas are carbon dioxide and possibly water vapour, in addition to which the flue gas includes small quantities of nitrogen oxides, sulphur dioxide, oxygen, and carbon monoxide, among others. In air combustion, flue gas includes a considerable proportion of nitrogen in addition to the above components. In order to provide good fluidisation and circulation of the solids suspension, the proportion of the primary gas 15 is usually at least 60% of the total quantity of the combustion gases 15, 16 supplied to the furnace 11.

The primary gas 15 is produced by means of first mixing means 21 by mixing air and/or pure oxygen 24 and circulated flue gas 25 together at a desired ratio. Equivalently, the secondary gas 16 is produced by means of second mixing means 22 by mixing air and/or pure oxygen 24 and circulated flue gas 25 together at a desired ratio. The oxygen can be produced e.g. by removing nitrogen from air by means of an oxygen plant or by some other suitable means. The circulated flue gas 25 can be taken from the flow path of flue gas either after the fly ash separation 18 or after the condenser 19 depending on the wish of using wet or dry flue gas.

The first mixing means 21 for producing the primary gas 15 and the second mixing means 22 for producing the secondary gas 16 can be in connection with the injection nozzles supplying gas to the furnace 11, or they can be separate from the furnace 11, whereby the injection nozzles are supplied with a ready-mixed gas mixture. The mixing means 21, 22 can consist of means known as such (valves, measuring sensors, regulators, etc.) for adjusting the oxygen content of the combustion gas supplied to the furnace.

There can be secondary gas nozzles located on several different heights and they each can be supplied with secondary gases having different oxygen contents. Then, each secondary gas flow 16 can be provided with its own mixing means 22 for adjusting the oxygen contents of the secondary gas flows.

Figure 2:
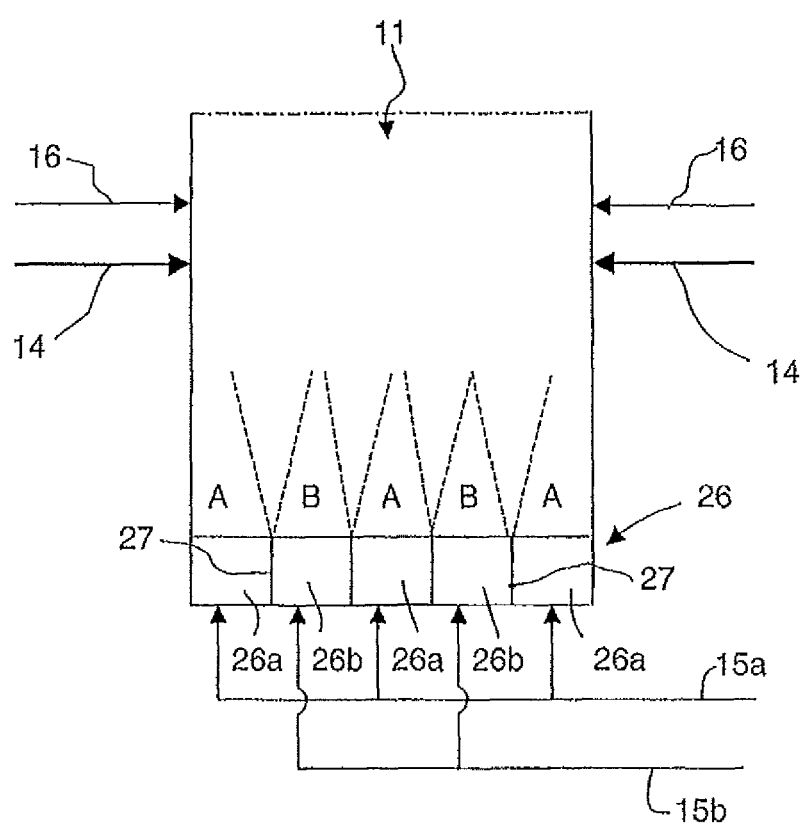

FIG. 2 shows an example of supplying primary gas by zones in the horizontal direction to the lower section of the furnace 11. At the bottom of the furnace 11, there is an air box 26 which is divided by means of dividing walls into five chambers 26a, 26b each of which is supplied with primary gas 15a, 15b which is a mixture of air and/or oxygen and/or circulated flue gas. In the example, two different primary gases 15a, 15b having different oxygen contents are guided to the air box 26. The first primary gas 15a, which has a higher oxygen content, is guided to three chambers 26a, 26a, two of which are located on the outer edges of the air box 26 and one in the middle. The second primary gas 15b, which has a lower oxygen content, is guided to two air chambers 26b which are located between the chambers 26a receiving the first primary gas 15a. Hence, the lower section of the furnace becomes divided in the horizontal direction into three oxidising zones A and two reducing zones B. In the reducing zones B, the reduction of nitrogen oxides to nitrogen occurs and, in the oxidising zones A, effective combustion occurs. Borders between the oxidising and reducing zones A, B disappear little by little as fluidisation gas rises upwards. As the borders between the zones A, B disappear, the oxygen contents and temperatures also stabilise in the horizontal direction of the furnace.

It is evident that the air box can be divided into chambers either in the longitudinal direction or the cross direction or in both directions, and the order of the oxidising and reducing zones can vary from the example shown in FIG. 2.

FIGS. 3-7 show more examples on how it is possible to feed at different points of the furnace in its horizontal direction combustion gases having different oxygen contents such that zones different of their oxygen content can be formed in the furnace in the horizontal direction.

Figures 3, 4:
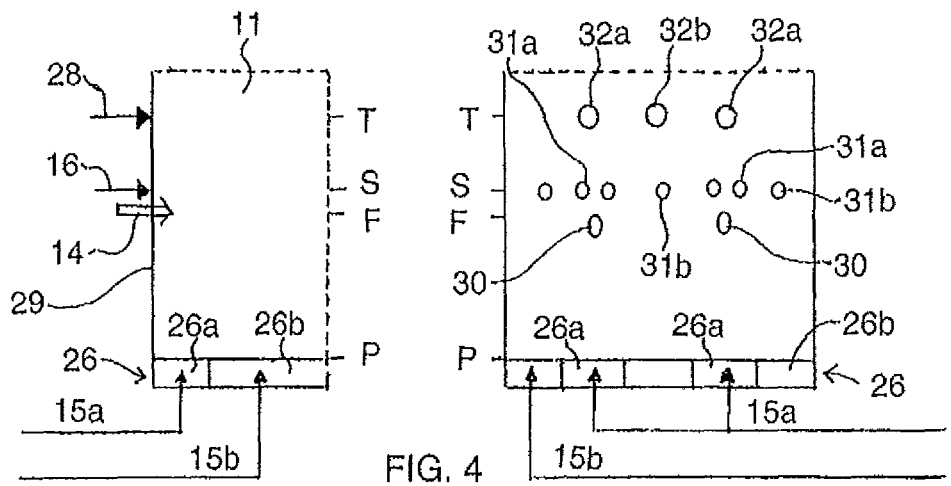
FIG. 4 shows a front view of the front section of the furnace and the feed levels of combustion gases.

FIG. 3 shows a side view and FIG. 4 a front view of a front section of the furnace 11. On a front wall 29 of the furnace on feed height F, there are several fuel feed points designated with reference number 30 via which the fuel 14 is fed to the furnace. Above the fuel feed height F, there is a secondary level S which comprises several combustion gas feed nozzles 31a, 31b via which secondary gas 16 is fed to the furnace. Above the secondary level S, there is yet a tertiary level T which comprises several tertiary gas feed nozzles 32a, 32b via which tertiary gas 28 is fed to the furnace. At the bottom of the furnace, there is the air box 26 the upper surface of which forms a primary level P at which primary gas 15a, 15b is supplied to the furnace.

Figure 5:
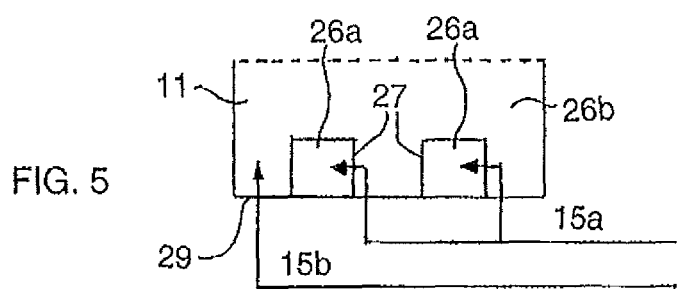
FIG. 5 shows a top view of the front section of the furnace cut at the point of the primary level P.

FIG. 5 shows a top view of the front section of the furnace seen from the height of the primary level P. The air box 26 comprises a uniform section 26b and two chambers 26a separated from it by separating walls 27 which are located in the vertical direction below the fuel feed points 30. The uniform section 26b of the air box is fed with combustion gas 15b having an oxygen content different from the oxygen content of primary gas 15a fed to the separate chambers 26a. Thus, it is possible to arrange below the fuel feed point 30 a zone having a desired oxygen content without requiring to alter the feed speed of primary gas.

Figure 6:
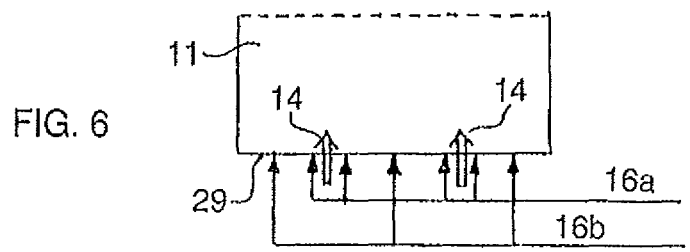
FIG. 6 shows a top view of the front section of the furnace cut at the point of the secondary level S.
Figure 7:
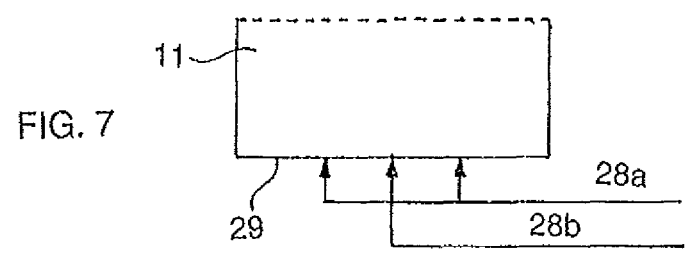
FIG. 7 shows a top view of the front section of the furnace cut at the point of the tertiary level T.

FIG. 6 shows a top view of the front section of the furnace seen from the height of the secondary level S. As shown in FIG. 4, on the front wall 29 of the furnace there are two fuel feed points 30 close to which, above them there are the first secondary gas nozzles 31a to which secondary gas 16a having a first oxygen content is guided. Between the feed points 30 and close to the side walls of the furnace, there are the second secondary gas nozzles 31b via which secondary gas 16b having a second oxygen content is guided to the furnace.

FIG. 7 again shows a top view of the front section of the furnace seen from the height of the tertiary level T. On the front wall 29 of the furnace, there are at the tertiary level T directly above the fuel feed points 30 located the first tertiary gas nozzles 32a via which tertiary gas 28a having a first oxygen content is guided to the furnace. In the horizontal direction, little farther from a vertical line passing the feed points 30 there is at least one second tertiary gas nozzle 32b via which tertiary gas 28b having a second oxygen content is guided to the furnace.

Below and above the fuel feed points 30, it is possible to guide via the chambers 26a of the air box 26, the secondary gas nozzles 31a and the tertiary gas nozzles 32a combustion gas the oxygen content of which is e.g. higher than the oxygen content of its combustion gas which is guided to the furnace 11 via the chamber 26b, the secondary gas nozzles 31b and the tertiary gas nozzles 32b horizontally farther from the fuel feed point 30 or the vertical line passing it. The feed nozzles of secondary and tertiary gas are divided into two categories. The first category comprises the feed nozzles 31a, 32a which are located substantially in the same vertical line as the fuel column rising upwards from the fuel feed point 30. This zone includes plenty of fuel and, to provide good combustion, it is important that this zone is supplied with oxygen-rich combustion gas. The second category comprises the feed nozzles 31b, 32b which can be located close to the furnace ends and in the section between fuel feed points 30 in which the fuel content of fluidised material is clearly lower than directly above the fuel feed points 30.

Many different variations of the invention are possible within the scope defined by claims presented next.

The invention claimed is:

1. A method for optimising combustion conditions in a fluidised-bed boiler where oxygenous combustion gas is fed at two or more height levels, the first of which is a primary level (P), which is located at the height of a furnace bottom, and the second is a secondary level (S), which is located close to fuel feed height (F), above which secondary level (S) there can be still other combustion gas feed levels (T, . . . ), characterised by producing combustion gases (15a, 15b; 16a, 16b; 28a, 28b) having different oxygen contents by mixing together air and pure oxygen or circulated flue gas at such a ratio that each combustion gas is provided with a desired oxygen content, and by feeding at least one of said combustion gas feed levels (P, S, T, . . . ) at different points in the horizontal direction of the furnace with combustion gases (15a, 15b; 16a, 16b; 28a, 28b) having different oxygen contents such that zones of different oxygen contents are formed in the horizontal direction of the furnace.

2. A method according to claim 1, characterised by dividing the primary level (P) in the horizontal direction into two or more zones and guiding to at least one of these zones combustion gas (15a) having an oxygen content different from the oxygen content of combustion gas (15b) guided to at least one zone adjacent to it.

3. A method according to claim 1 or 2, characterised by dividing the secondary level (S) and/or one of the levels (T, . . . ) above it into two or more zones in the horizontal direction and guiding to at least one of these zones combustion gas (16a; 28a) having an oxygen content different from the oxygen content of combustion gas (16b; 28b) guided to at least one zone adjacent to it.

4. A method according to claim 3, characterised by there being several fuel feed points on the fuel feed height (F) and by forming below and/or above each fuel feed point a zone in which at least one combustion gas feed level (P, S, T, . . . ) feeds with combustion gas (15a, 15b; 16a, 16b; 28a, 28b) having an oxygen content different from that fed in zones being farther from the fuel feed point at the same feed level (P, S, T, . . . ).

5. An arrangement for optimising combustion conditions in a fluidised-bed boiler, which arrangement comprises means for feeding oxygenous combustion gas at two or more height levels, the first of which height levels is a primary level (P), which is located at the height of a furnace bottom, and the second is a secondary level (S), which is located close to fuel feed height (F), above which secondary level (S) there can be still other combustion gas feed levels (T, . . . ), wherein the combustion gas feed arrangements comprise means for mixing air and pure oxygen or circulated flue gas together such that the combustion gas (15a, 15b; 16a, 16b; 28a, 28b) is provided with a desired oxygen content, and that at least one of said combustion gas feed levels (P, S, T, . . . ) is provided with combustion gas feed arrangements (26a, 26b; 31a, 31b; 32a, 32b) that are arranged to feed at different points in the horizontal direction of the furnace combustion gases (15a, 15b; 16a, 16b; 28a, 28b) having different oxygen contents such that zones of different oxygen contents can be formed in the horizontal direction of the furnace.

6. An arrangement according to claim 5, wherein the combustion gas feed arrangements at the primary level (P) comprise an air box that is divided in the horizontal direction into two or more chambers (26a, 26b), and that at least one of these chambers (26a, 26b) is arranged to feed the furnace with combustion gas (15a) having an oxygen content different from the oxygen content of combustion gas (15b) guided to the furnace via at least one chamber (26a, 26b) adjacent to it.

7. An arrangement according to claim 5 or 6, wherein the secondary level (S) and/or one of the feed levels (T, . . . ) above it is/are divided in the horizontal direction into two or more zones and each of these zones is provided with combustion gas feed nozzles (31a, 31b, 32a, 32b) via which to said zone is guidable combustion gas (16a; 28a) having an oxygen content different from the oxygen content of combustion gas (16b; 28b) guided to the furnace via at least one zone adjacent to it.

8. An arrangement according to claim 7, wherein the fuel feed height (F) includes fuel feed points and a zone is formed below and/or above each fuel feed point in which at the secondary level (S) or at the feed level (T, . . . ) above is arranged to be fed combustion gas having an oxygen content different from that fed in the zones being farther from the fuel feed point at the same feed level (S, T, . . . ).

* * * * *